United States Patent
Jang et al.

(10) Patent No.: US 11,284,433 B2
(45) Date of Patent: Mar. 22, 2022

(54) METHOD AND DEVICE FOR DETECTING UPLINK LBT FAILURE IN WIRELESS COMMUNICATION SYSTEM USING UNLICENSED BAND

(71) Applicant: Samsung Electronics Co., Ltd., Gyeonggi-do (KR)

(72) Inventors: Jaehyuk Jang, Gyeonggi-do (KR); Anil Agiwal, Gyeonggi-do (KR)

(73) Assignee: Samsung Electronics Co., Ltd

( * ) Notice: Subject to any disclaimer, the term of this patent is extended or adjusted under 35 U.S.C. 154(b) by 3 days.

(21) Appl. No.: 16/832,093

(22) Filed: Mar. 27, 2020

(65) Prior Publication Data

US 2020/0314903 A1 Oct. 1, 2020

(30) Foreign Application Priority Data

Mar. 28, 2019 (KR) .................. 10-2019-0035577

(51) Int. Cl.
- H04W 74/08 (2009.01)
- H04W 16/14 (2009.01)
- H04W 24/08 (2009.01)
- H04W 72/04 (2009.01)

(52) U.S. Cl.
CPC ....... *H04W 74/0808* (2013.01); *H04W 16/14* (2013.01); *H04W 24/08* (2013.01); *H04W 72/0413* (2013.01); *H04W 72/0493* (2013.01); *H04W 74/0833* (2013.01)

(58) Field of Classification Search
CPC ......... H04W 74/0833; H04W 72/0493; H04W 72/0413; H04W 74/0808; H04W 24/08; H04W 16/14; H04W 76/19
See application file for complete search history.

(56) References Cited

U.S. PATENT DOCUMENTS

| 2018/0124687 | A1 | 5/2018 | Park et al. |
| 2020/0221495 | A1* | 7/2020 | Chen .................. H04W 36/305 |
| 2020/0344819 | A1* | 10/2020 | Myung ............ H04W 74/0808 |
| 2021/0044392 | A1* | 2/2021 | Myung ................ H04W 16/14 |

(Continued)

FOREIGN PATENT DOCUMENTS

WO  WO 2019/035631  2/2019

OTHER PUBLICATIONS

Ericsson, "Handling UL LBT Failures", R2-1901674, 3GPP TSG RAN WG2 #105, Feb. 25-Mar. 1, 2019, 3 pages.

(Continued)

*Primary Examiner* — Brian D Nguyen
(74) *Attorney, Agent, or Firm* — The Farrell Law Firm, P.C.

(57) ABSTRACT

The disclosure relates to a communication technique for convergence of a 5G communication system for supporting a higher data transmission rate beyond a 4G system with an IoT technology, and a system therefor. The disclosure may be applied to intelligent services (e.g., smart homes, smart buildings, smart cities, smart cars or connected cars, health care, digital education, retail business, security and safety-related services, etc.) based on 5G communication technology and IoT-related technology. The disclosure relates to a method and apparatus for detecting an uplink listen-before-talk (LBT) failure when using a 3GPP 5G new radio (NR) technology in a wireless communication system.

16 Claims, 10 Drawing Sheets

(56) References Cited

U.S. PATENT DOCUMENTS

| | | | |
|---|---|---|---|
| 2021/0084616 A1* | 3/2021 | Vaidya | H04W 68/02 |
| 2021/0099259 A1* | 4/2021 | Salem | H04L 1/1854 |
| 2021/0099963 A1* | 4/2021 | Jeon | H04W 74/0866 |
| 2021/0160927 A1* | 5/2021 | Shi | H04W 74/0816 |
| 2021/0168876 A1* | 6/2021 | Wu | H04L 5/0016 |
| 2021/0204330 A1* | 7/2021 | Tang | H04W 56/001 |

OTHER PUBLICATIONS

CMCC, "Consideration on BWP Switching and Multi-Activation for NR-U", R2-1901944, 3GPP TSG-RAN wG2 Meeting #105, Feb. 25-Mar. 1, 2019, 3 pages.

OPPO, "Introduce LBT Failure Counter in MAC Layer", R2-1901189, 3GPP TSG-RAN WG2 Meeting #105, Feb. 25-Mar. 1, 2019, 3 pages.

International Search Report dated Jul. 2, 2020 issued in counterpart application No. PCT/KR2020/004200, 7 pages.

\* cited by examiner

METHOD AND DEVICE FOR DETECTING UPLINK LBT FAILURE IN WIRELESS COMMUNICATION SYSTEM USING UNLICENSED BAND

CROSS-REFERENCE TO RELATED APPLICATION(S)

This application is based on and claims priority under 35 U.S.C. § 119 to Korean Patent Application No. 10-2019-0035577, filed on Mar. 28, 2019, in the Korean Intellectual Property Office, the entire disclosure of which is incorporated herein by reference.

BACKGROUND

1. Field

The disclosure relates generally to a method for detecting an uplink listen-before-talk (LBT) failure, and more specifically, to detecting an LBT failure when using a 3rd generation partnership project (3GPP) $5^{th}$ generation (5G) new radio (NR) technology in a wireless communication system.

2. Description of Related Art

To meet the increasing demand for wireless data traffic since deployment of $4^{th}$ generation (4G) communication systems, efforts have been made to develop an improved 5G or pre-5G communication system. The 5G or pre-5G communication system may also referred to as a "beyond 4G network" or a "post long term evolution (LTE) system".

The 5G communication system is expected to be implemented in higher frequency (mmWave) bands, e.g., 60 GHz bands, in order to accomplish higher data rates. To decrease propagation loss of radio waves and increase transmission distance, beamforming, massive multiple-input multiple-output (MIMO), full dimensional MIMO (FD-MIMO), array antenna, an analog beam forming, large scale antenna techniques are being discussed for use in 5G communication systems.

In addition, in 5G communication systems, development is under way for system network improvement based on advanced small cells, cloud radio access networks (RANs), ultra-dense networks, device-to-device (D2D) communication, wireless backhaul, moving network, cooperative communication, coordinated multi-points (CoMP), reception-end interference cancellation, etc. In the 5G system, hybrid frequency shift keying (FSK) and quadrature amplitude modulation (QAM) (FQAM) and sliding window superposition coding (SWSC) have been developed for advanced coding modulation (ACM). Filter bank multi carrier (FBMC), non-orthogonal multiple access (NOMA), and sparse code multiple access (SCMA) have been developed as advanced access technologies.

The Internet is evolving to the Internet of things (IoT) where distributed entities, such as things, exchange and process information without human intervention. The Internet of everything (IoE) has also emerged, which is a combination of the IoT technology and big data processing technology through connection with a cloud server. As technology elements, such as "sensing technology", "wired/wireless communication and network infrastructure", "service interface technology", and "security technology" are demanded for IoT implementation, a sensor network, a machine-to-machine (M2M) communication, machine type communication (MTC), etc., are being researched.

An IoT environment may provide intelligent Internet technology services by collecting and analyzing data generated among connected things. IoT may be applied to a variety of fields including smart homes, smart buildings, smart cities, smart cars or connected cars, smart grids, health care, smart appliances, and advanced medical services through the convergence and combination of existing information technology (IT) and various industrial applications.

Accordingly, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described big data processing technology may also be considered an example of convergence of the 5G technology with the IoT technology.

Recently, with the development of LTE and LTE-advanced (LTE-A), research on a technology for operating a mobile communication system in an unlicensed band has been actively conducted. In particular, channel sensing (or LBT) may be utilized in the unlicensed band. In this case, a method and device for smoothly operating a mobile communication system in an unlicensed band is required.

SUMMARY

An aspect of the disclosure is to provide a method for detecting an uplink transmission failure due to interference of another device in an unlicensed band.

Another aspect of the disclosure is to provide a method for detecting an uplink transmission failure due to interference of another device in an unlicensed band, and reestablishing a connection with a new base station.

In accordance with an aspect of the disclosure, a method is provided for a terminal in a wireless communication system. The method includes receiving system information including a listen before talk (LBT)-related parameter; performing LBT for a first bandwidth part (BWP) of a cell; determining whether or not the LBT has been successful for the first BWP, based on the system information; declaring an LBT failure for the first BWP, in response to determining that the LBT has not been successful for the first BWP; and switching from the first BWP to a second BWP for operation of the terminal In accordance with another aspect of the disclosure, a terminal is provided for use in a wireless communication system. The terminal includes a transceiver; and a controller configured to receive, from a base station, via the transceiver, system information including a listen before talk (LBT)-related parameter, perform LBT for a first bandwidth part (BWP) of a cell, determine whether or not the LBT has been successful for the first BWP, based on the system information, declare an LBT failure for the first BWP, in response to determining that the LBT has not been successful for the first BWP, and switch from the first BWP to a second BWP for operation of the terminal.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
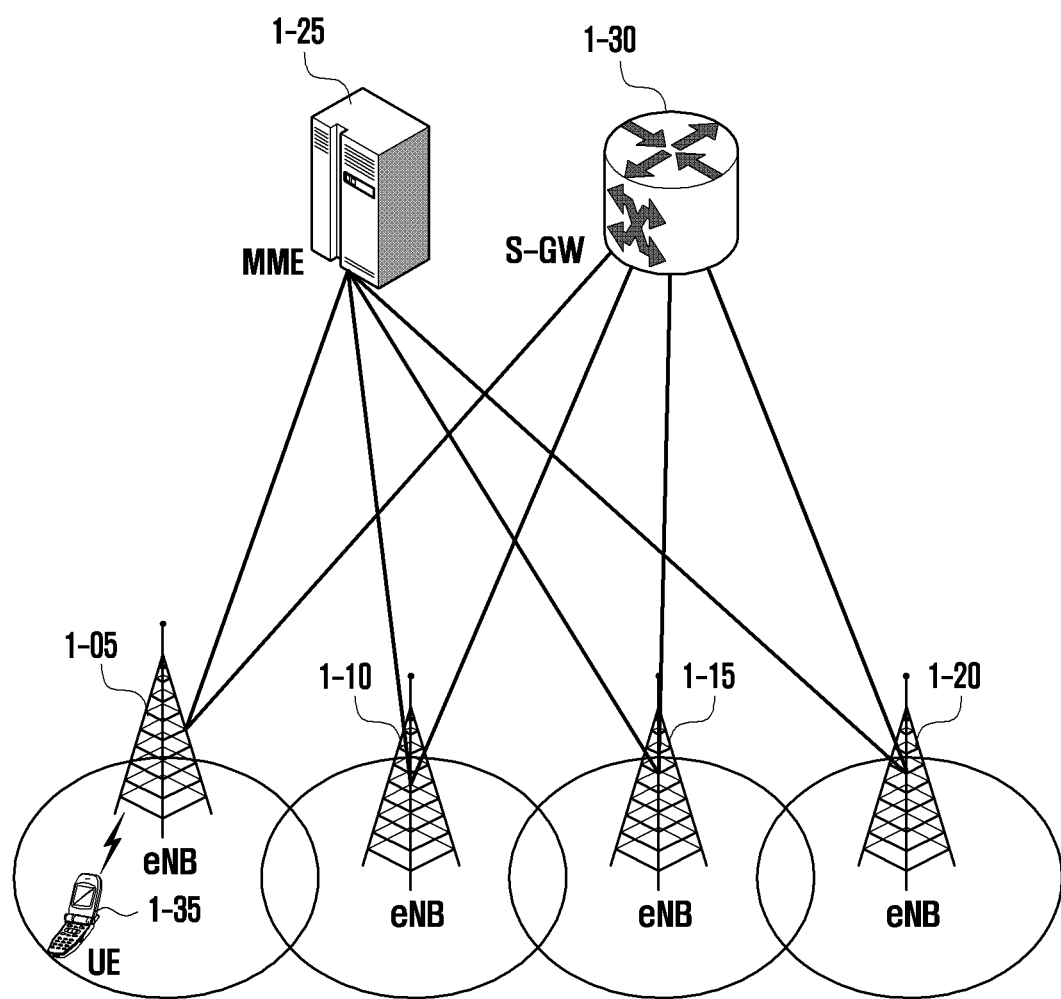
FIG. 1 illustrates an LTE system according to an embodiment.

Hereinafter, various embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms described below are defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by referring to embodiments as described below in detail in conjunction with the accompanying drawings. However, the disclosure is not limited to the embodiments set forth below and may be implemented in various forms. The following embodiments are provided only to completely disclose the disclosure and inform those skilled in the art of the scope of the disclosure, and the disclosure is defined only by the scope of the appended claims.

Throughout the specification, the same or like reference numerals designate the same or like elements.

In the following description, terms for identifying access nodes, terms referring to network entities, terms referring to messages, terms referring to interfaces between network entities, terms referring to various identification information, etc., are illustratively used for convenience. Therefore, the disclosure is not limited by the terms as used below, and other terms referring to subjects having equivalent technical meanings may be used.

The disclosure also uses terms and names defined in the LTE and NR standards, which are the standards defined by the 3GPP organization among existing communication standards. However, the disclosure is not limited by the above terms and names and may be equally applied to systems conforming to other standards. In particular, the disclosure is applicable to 3GPP NR (5G mobile communication standard).

FIG. 1 illustrates an LTE system structure according to an embodiment. An NR system has a similar structure.

Referring to FIG. 1, the LTE wireless communication system includes multiple base stations 1-05, 1-10, 1-15, and 1-20, a mobility management entity (MME) 1-25, and a serving-gateway (S-GW) 1-30. A user equipment (UE) or terminal 1-35 accesses an external network via the base stations 1-05, 1-10, 1-15, and 1-20 and the S-GW 1-30.

The base stations 1-05, 1-10, 1-15, and 1-20 are access nodes of a cellular network and provide wireless access to terminals accessing the network. That is, the base stations 1-05, 1-10, 1-15, and 1-20 collect state information, such as buffer states, available transmission power states, channel states, etc., of the terminals and perform scheduling so as to serve traffic of users, and support connections between the terminals and a core network (CN).

The MME 1-25 is in charge of various control functions and a mobility management function for the terminal 1-35. The MME 1-25 is connected to the plurality of base stations 1-05, 1-10, 1-15, and 1-20. The S-GW 1-30 provides a data bearer. The MME 1-25 and the S-GW 1-30 may further perform authentication for the terminal 1-35 accessing a network, bearer management, etc., and process packets received from the base stations 1-05, 1-10, 1-15, and 1-20 and packets to be transferred to the base stations 1-05, 1-10, 1-15, and 1-20.

Figure 2:
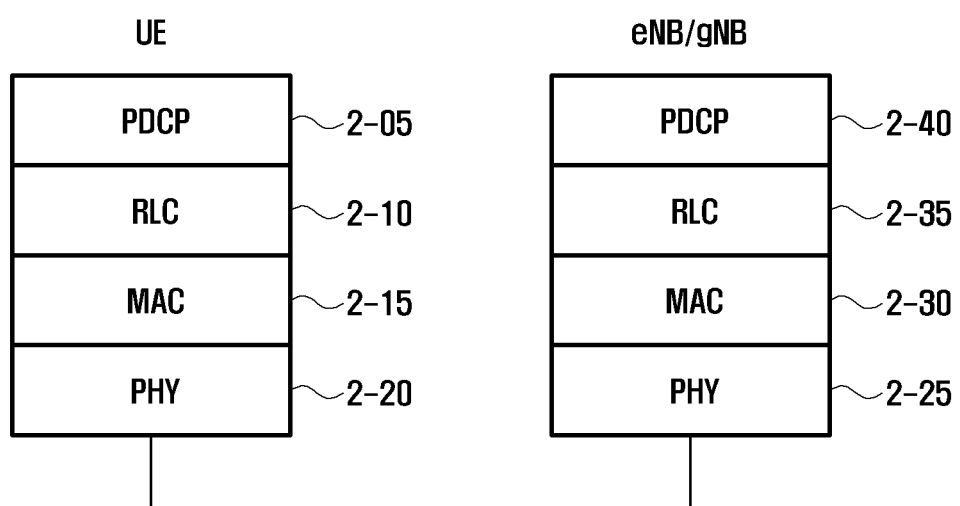
FIG. 2 illustrates a radio protocol structure in an LTE or NR system, according to an embodiment.

FIG. 2 illustrates a radio protocol structure in an LTE or NR system, according to an embodiment.

Referring to FIG. 2, a radio protocol of the LTE system includes packet data convergence protocols (PDCPs) 2-05 and 2-40, radio link controls (RLCs) 2-10 and 2-35, and medium access controls (MAC) 2-15 and 2-30 in a terminal (or UE) and a base station (or an eNB or gNB), respectively. The PDCPs 2-05 and 2-40 are responsible for operations, such as Internet protocol (IP) header compression/restoration, and the RLCs 2-10 and 2-35 reconfigure a PDCP packet data unit (PDU) to an appropriate size. The MAC 2-15 and 2-30 are connected to multiple RLC layer devices included in one terminal, and perform multiplexing of RLC PDUs to a MAC PDU and demultiplexing of the RLC PDUs from the MAC PDU.

Physical (PHY) layers 2-20 and 2-25 perform channel-coding and modulation of upper layer data, configure the channel-coded and modulated upper layer data into orthogonal frequency division multiplexing (OFDM) symbols, and transmit the OFDM symbols via a wireless channel, or demodulate and channel-decode OFDM symbols received via the wireless channel and transfer the same to an upper layer. The physical layers use hybrid automatic repeat request (HARQ) for additional error correction, and a reception end transmits, in 1 bit, an indication as to whether a packet transmitted by a transmission end is received. This is referred to as HARQ acknowledgement/negative acknowledgement (ACK/NACK) information. In an LTE system, downlink HARQ ACK/NACK information for uplink data transmission is transmitted via a physical hybrid-ARQ indicator channel (PHICH), which is a physical channel. In an NR system, because NR applies asynchronous HARQ, whether retransmission is necessary or new transmission may be performed in a physical dedicated control channel (PDCCH) may be determined according to scheduling information of a corresponding terminal. The PDCCH is a channel through which downlink/uplink resource allocation, etc. are transmitted.

Uplink HARQ ACK/NACK information for a downlink data transmission may be transmitted via a physical channel, such as a physical uplink control channel (PUCCH) or a physical uplink shared channel (PUSCH). The PUCCH is generally transmitted in an uplink of a primary cell (PCell). However, if supported by a terminal, the base station may further transmit, to the terminal, the PUCCH in a secondary cell (SCell). The SCell may also be referred to as a PUCCH SCell.

Although not illustrated in FIG. 2, a radio resource control (RRC) layer is present above the PDCP layer of each of the terminal and the base station, and a configuration control message related to measurement and access may be exchanged for radio resource control, in the RRC layer.

The PHY layer may include one or multiple frequencies/carriers, and a technology of concurrently configuring and using multiple frequencies is called a carrier aggregation (CA) technology. In the CA technology, using only one carrier for communication between a terminal and a base station is changed into further using one main carrier and one or multiple sub-carriers, so that the amount of transmission may be dramatically increased by the number of sub-carriers. In LTE, a cell of a base station, which uses a main carrier, is referred to as a main cell or a PCell, and a cell of a base station, which uses a sub-carrier, is referred to as a sub-cell or an SCell.

Figure 3:
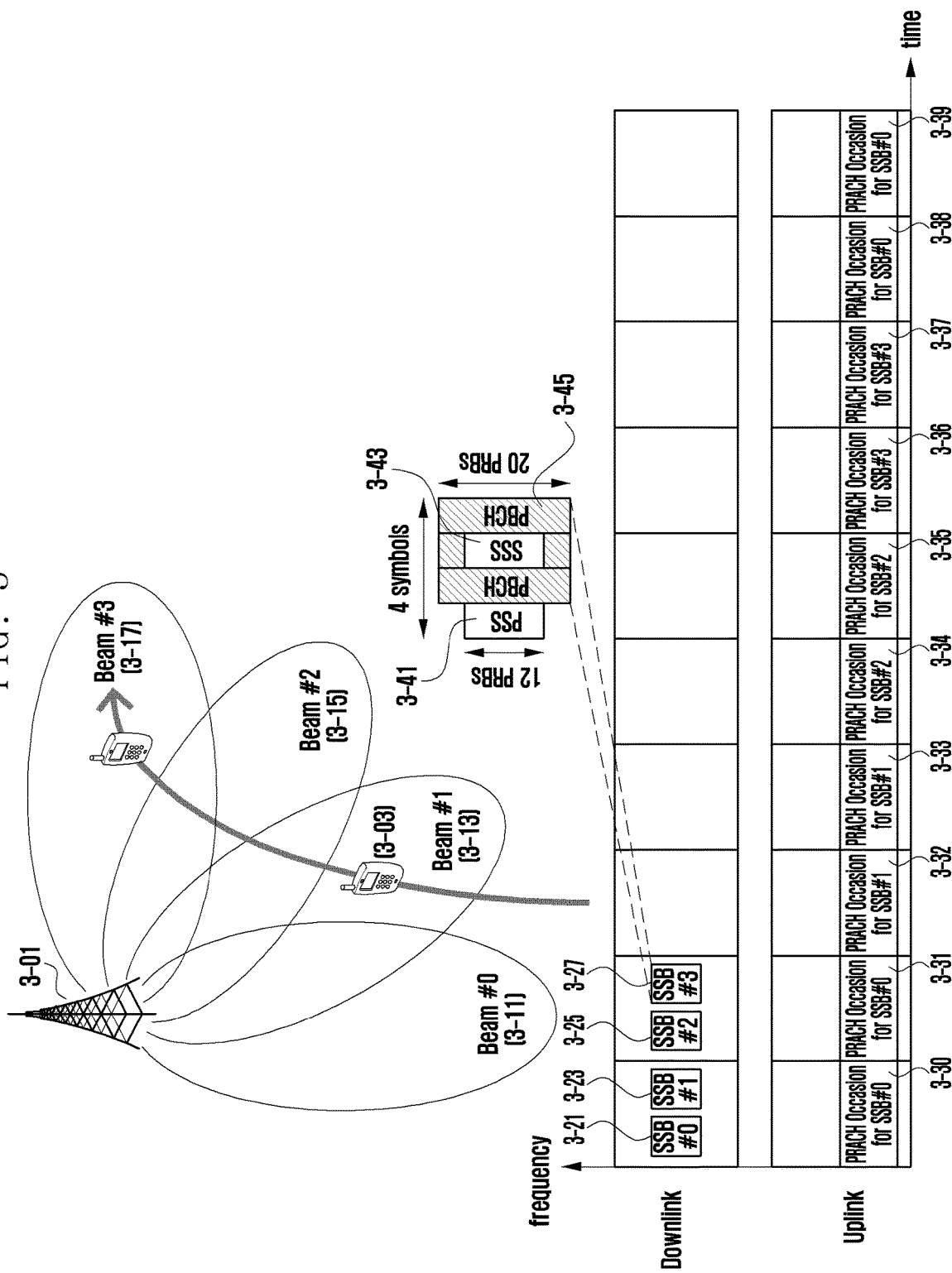
FIG. 3 illustrates a downlink and an uplink channel frame structure when communication is performed based on a beam in an NR system according to an embodiment.

FIG. 3 illustrates a downlink and an uplink channel frame structure when communication is performed based on a beam in an NR system according to an embodiment.

Referring to FIG. 3, a base station 3-01 transmits signals in the form of beams 3-11, 3-13, 3-15, and 3-17 in order to transmit strong signals or transmit signals to wider coverage areas. Accordingly, a terminal 3-03 within a cell should transmit or receive data using a specific beam (e.g., beam #1 3-13) transmitted by the base station 3-01.

Depending on whether the terminal 3-03 is connected to the base station 3-01, states of the terminal 3-03 are classified as a dormant mode (or RRC_IDLE) and a connected mode (or RRC_CONNECTED). The base station 3-01 is unable to identify a location of the terminal 3-03 in the dormant mode.

If the terminal 3-03 in the dormant mode is to transition to the connected mode, the terminal 3-03 receives synchronization signal blocks (SSBs) 3-21, 3-23, 3-25, and 3-27 from the base station 3-01. The SSBs are SSB signals transmitted periodically according to a period configured by the base station 3-01, and are divided into a primary synchronization signal (PSS) 3-41, a secondary synchronization signal (SSS) 3-43, and a physical broadcast channel (PBCH) 3-45.

In FIG. 3, it is assumed that an SSB is transmitted for each of the beam. Specifically, FIG. 3 illustrates SSB #0 3-21 being transmitted using beam #0 3-11, SSB #1 3-23 being transmitted using beam #1 3-13, SSB #2 3-25 being transmitted using beam #2 3-15, and SSB #3 3-27 being transmitted using beam #3 3-17.

In FIG. 3, it is assumed that the terminal 3-03 in the dormant mode is located in beam #1 3-13. However, even when the terminal 3-03 is in the connected mode and performs random access, the terminal 3-03 selects an SSB received at a point in time when random access is performed.

Accordingly, in FIG. 3, the SSB #1 3-23 transmitted via beam #1 3-13 is received by the terminal 3-03. Upon reception of the SSB #1 3-23, the terminal 3-03 acquires a physical cell identifier (PCI) of the base station 3-01 via PSS and SSS, and the terminal 3-03 may determine, by receiving a PBCH, an identifier (i.e., #1) of a currently received SSB, and a position within a 10 ms frame, at which the current SSB is received, as well as a position within a system frame number (SFN) having a period of 10.24 seconds.

A master information block (MIB) is included in the PBCH. The MIB indicates a position at which system information block type 1 (SIB 1) configured to broadcast more detailed cell configuration information may be received.

Upon reception of SIB 1, the terminal 3-03 may identify a total number of SSBs transmitted by the base station 3-01, and may determine positions of physical random access channel (PRACH) occasions for random access in order to transition to the connected mode. More specifically, the PRACH occasions allow for transmission of a preamble that is a physical signal specifically designed for matching uplink synchronization. In FIG. 3, a scenario of allocation at every 1 ms has been assumed, from 3-30 to 3-39.

In addition, based on the reception of SIB 1, the terminal 3-03 may identify which PRACH occasion among the PRACH occasions is mapped to which SSB index. For example, in FIG. 3, a scenario of allocation at every 1 ms has been assumed, and a scenario of allocating a ½ SSB per PRACH occasion (i.e., two PRACH occasions per SSB) has been assumed. Accordingly, two PRACH occasions are allocated to each SSB from a start of the PRACH occasions starting according to SFN values. More specifically, PRACH occasions 3-30 and 3-31 are allocated for SSB #0, and PRACH occasions 3-32 and 3-33 are allocated for SSB #1. After configuration for all SSBs, PRACH occasions 3-38 and 3-39 are reallocated for SSB #0.

The terminal 3-03 recognizes the positions of the PRACH occasions 3-32 and 3-33 for SSB #1, and transmits a random access preamble via a fastest PRACH occasion (e.g., 3-32) at a current time point from among the PRACH occasions 3-32 and 3-33 corresponding to SSB #1. Because the base station 3-01 has received the preamble in the PRACH occasion of 3-32, it may identify that the terminal 3-03 has selected SSB #1 3-23 and transmitted the preamble, and therefore, data is transmitted or received via a corresponding beam when subsequent random access is performed.

Even when the terminal 3-03 in the connected state moves from a current (source) base station to a target base station, e.g., due to handover, the terminal 3-03 performs random access at the target base station, and selects the SSB to transmit random access, as described above. In addition, during a handover, a handover command is transmitted to the terminal 3-03 so that the terminal 3-03 moves from the source base station to the target base station. The handover command may be assigned a random access preamble identifier dedicated for each SSB of the target base station, so that the dedicated random access preamble identifier may be used when random access is performed in the target base station. The base station may not allocate dedicated random access preamble identifiers for all beams (depending on a current position of the terminal, etc.), and thus some SSBs may not be allocated dedicated random access preamble identifiers (e.g., allocating dedicated random access preambles only to bean #2 and beam #3).

If a dedicated random access preamble is not allocated to an SSB selected for preamble transmission, the terminal 3-03 randomly selects a contention-based random access preamble and performs random access. For example, in FIG. 3, the terminal 3-03 is located in Beam #1 3-13 and performs random access, but after failure, when the random access preamble is transmitted again, a scenario is possible in which the terminal 3-03 is located in beam #3 3-17 and transmits the dedicated preamble. That is, even in one random access procedure, if a preamble re-transmission occurs, a contention-based random access procedure and a non-contention-based random access procedure may be mixed depending on whether a dedicated random access preamble is allocated to the selected SSB at each preamble transmission.

Figure 4:
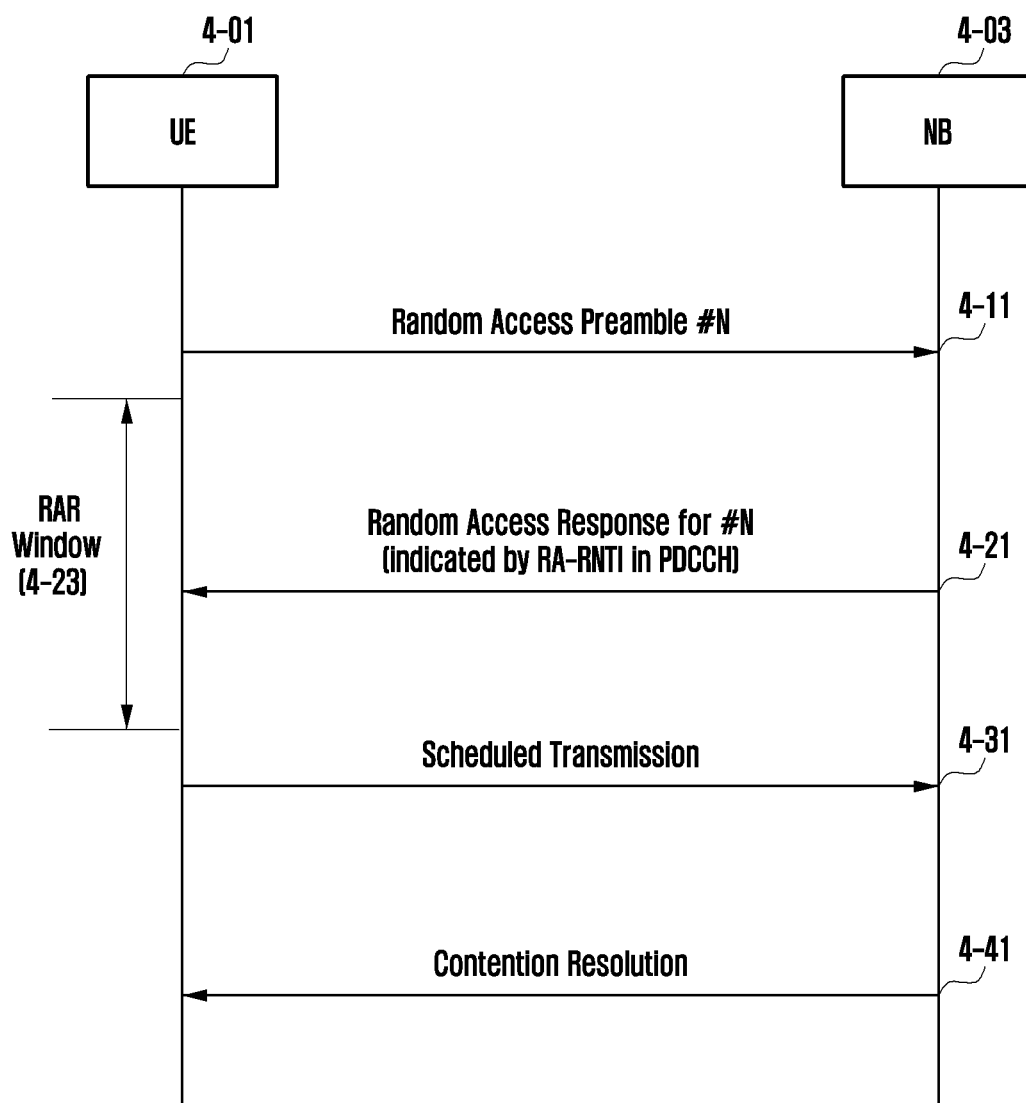
FIG. 4 illustrates a procedure of performing contention-based 4-step random access to a base station by a terminal according to an embodiment.

FIG. 4 illustrates a procedure of performing contention-based 4-step random access to a base station by a terminal according to an embodiment. Specifically, FIG. 4 illustrates a contention-based 4-step random access procedure performed by a terminal in various scenarios requiring initial access, reconnection, handover, and other random accesses to a base station.

Referring to FIG. 4, in order to access a base station 4-03, a terminal 4-01 selects a PRACH, e.g., according to FIG. 3 as described above, and transmits a random access preamble to the PRACH in step 4-11. One or more terminals may concurrently transmit a random access preamble via the PRACH resource. The PRACH resource may span one subframe, or only a part of symbols in one subframe may be used. The information on the PRACH resource may be included in system information that is broadcast by the base station 4-03, and therefore, a time frequency resource in which the preamble should be transmitted may be identified. The random access preamble corresponds to a specific sequence for reception even if transmission is performed before complete synchronization with the base station. There may be multiple preamble identifiers (or indexes) according to the standard. If there are multiple preamble identifiers, the preamble transmitted by the terminal 4-01 may be randomly selected by the terminal 4-01, or may be a specific preamble designated by the base station 4-03.

In response to receiving the preamble, the base station 4-03 transmits a random access response (RAR) message to the terminal 4-01 in step 4-21. The RAR message includes identification information of the preamble used in step 4-11, uplink transmission timing correction information, temporary terminal identifier information, and uplink resource allocation information. For example, if a plurality of terminals attempt random access by transmitting different preambles in step 4-11, the identifier information of the preamble is transmitted to indicate a preamble, for which the RAR message is a response message. The uplink resource allocation information includes detailed information of a resource to be used by the terminal 4-01 in step 4-31, and includes a physical position and a size of the resource, a modulation and coding scheme (MCS) used when transmission is performed, and power adjustment information when transmission is performed. If the terminal 4-01 having transmitted the preamble performs initial access does not have an identifier for communication with the base station 4-03, a temporary terminal identifier information may be used.

The RAR message should be transmitted within a predetermined period starting from a predetermined time after transmission of the preamble. The period may be referred to as an RAR window 4-23. The RAR window 4-23 starts from a predetermined time after transmission of a first preamble. The predetermined time may have a subframe unit (e.g., 4 ms) or a smaller value. A length of the RAR window 4-23 may be a predetermined value configured by the base station 4-03 for each PRACH resource or one or more PRACH resource sets, within a system information message that is broadcast by the base station 4-03.

When the RAR message is transmitted, the base station 4-03 schedules the RAR message via the PDCCH, and the scheduling information is scrambled using a random access-radio network temporary identifier (RA-RNTI). The RA-RNTI is mapped to the PRACH resource used to transmit the message in step 4-11, and the terminal 4-01 having transmitted a preamble to a specific PRACH resource attempts to receive the PDCCH based on the RA-RNTI, and thus determine whether a corresponding RAR message exists. If the RAR message is a response to the preamble transmitted by the terminal 4-01 in step 4-11, the RA-RNTI used in the RAR message scheduling information includes information on the transmission in step 4-11. The RA-RNTI may be calculated using Equation (1) below.

$$\text{RA-RNTI} = 1 + s\_id + 14 \times t\_id + 14 \times 80 \times f\_id + 14 \times 80 \times 8 \times ul\_carrier\_id \quad (1)$$

In Equation (1), s_id is an index corresponding to a first OFDM symbol at which the preamble transmission performed in step 4-11 is started, and has a value of $0 \leq s\_id < 14$ (i.e., a maximum number of OFDM in one slot). Further, t_id is an index corresponding to a first slot in which the preamble transmission performed in step 4-11 is started, and has a value of $0 \leq t\_id < 80$ (i.e., a maximum number of slots in one system frame (40 ms)). Further, f_id indicates the number of PRACH resources before a PRACH resource in which the preamble transmitted in step 4-11 is transmitted, and has a value of $0 \leq f\_id < 8$ (i.e., a maximum number of PRACHs on frequency within the same time). If two carriers are used in uplink for one cell, ul_carrier_id is a factor for distinguishing whether the preamble is transmitted in a normal uplink (NUL) (0 in this case) or whether the preamble is transmitted in a supplementary uplink (SUL) (1 in this case).

In response to receiving the RAR message, in step 4-31, the terminal 4-01 transmits different messages to the resource allocated to the RAR message, according to the aforementioned various purposes. In FIG. 4, a third message may be referred to as Msg3. Similarly, the preamble in step 4-11 may be referred to as Msg1, and the RAR in step 4-21 may be referred to as Msg2. Examples of a Msg3 transmitted by the terminal 4-01 include an RRCConnectionRequest message, which is a message of an RRC layer, transmitted in a case of an initial connection, an RRCConnectionReestablishmentRequest message transmitted in a case of a reconnection, and an RRCConnectionReconfigurationComplete message transmitted during a handover. Alternatively, a buffer status report (BSR) message for a resource request may be transmitted.

Thereafter, for an initial transmission (i.e., when Msg3 does not include base station identifier information previously allocated to the terminal 4-01), the terminal 4-01 receives a contention resolution message from the base station 4-03 in step 4-41. Because content transmitted in Msg3 by the terminal 4-01 is included in the contention resolution message, even if there are a plurality of terminals that have selected the same preamble in step 4-11, a terminal, to which a response is made, may be informed.

A contention resolution timer (ra-ContentionResolutionTimer) is started or restarted when an uplink allocated for Msg3 transmission via the RAR or PDCCH ends (e.g., a first OFDM symbol after the uplink). Accordingly, the terminal 4-01 attempts to receive Msg4 from the base station 4-03 until the timer expires, and if Msg4 is not received until the timer expires, the terminal 4-01 determines that contention resolution has failed and retransmits the preamble.

The above-described 5G system may consider a scenario of performing an operation in an unlicensed band. An unlicensed band is a frequency band that is freely available to anyone without a license within the regulatory permit at a corresponding frequency. For example, there is a 2.4 GHz band or a 5 GHz band, and wireless local area network (LAN), Bluetooth™, etc., perform communication using a corresponding frequency.

In order to perform communication in the unlicensed band, data must be transmitted or received according to regulations set for each country. According to the regulations, before a communication device performs transmission in the unlicensed band, the communication device should "listen" and determine whether the unlicensed band is occupied by another communication device, and then perform "transmission" if the unlicensed band is determined to be vacant. This scheme of listening and performing transmission when vacant is referred to as LBT. Regulations that require the LBT to be performed by country and unlicensed band have been determined, and a communication device should perform LBT when performing communication in the unlicensed band in accordance with these regulations.

There are generally two types of LBT, type 1 and type 2.

Figure 5:
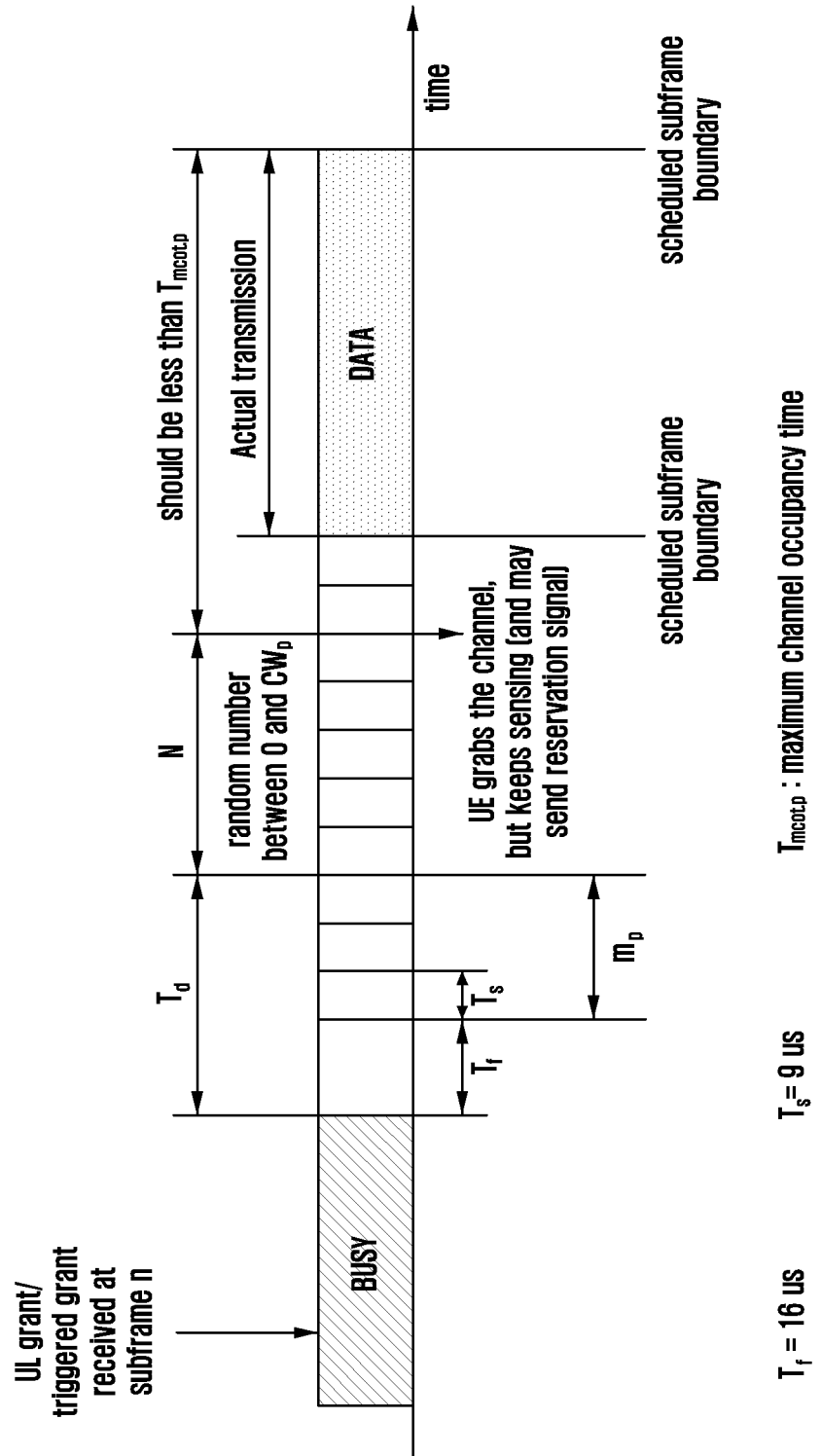
FIG. 5 illustrates LBT type 1 according to an embodiment.

FIG. 5 illustrates LBT type 1 according to an embodiment.

Referring to FIG. 5, LBT type 1 includes randomly determining, before performing transmission, a time to listen to whether other peripheral devices perform transmission, and performing transmission when a channel is vacant for a random time period. A communication device first listens whether a channel is vacant for a fixed time ($T_d$), and when the channel is vacant, determines whether the channel is vacant for a random time period (N).

A method of determining values of $T_d$ and N may be differentially determined according to a priority, importance of traffic, etc., and there is a total of four different classes. The class is referred to as a channel access priority class (CAPC).

According to the CAPC, a time length of $T_d=16+m_p*9$ (μs) is obtained, and $N=random(0, CW_p)*9$ (μs) is obtained, wherein a CW value starts from $CW_{min,p}$, and at each time when transmission fails, the CW value doubles and has a maximum value of $CW_{max,p}$.

For example, if LBT is performed using a scheme in which the CAPC is 3, $T_d$ has a length of 16+3*9=43 μs, and N selects a random value between 0 and 15 for initial transmission. For example, if 7 is selected, N is 7*9=63 μs, and the communication device transmits data when the channel is vacant for 106 μs.

TABLE 1

| Channel Access Priority Class (p) | $m_p$ | $CW_{min, p}$ | $CW_{max, p}$ | $T_{mcot, p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In the example above (where 7 is selected for N), if it is determined that a channel is occupied by another device (i.e., a received signal strength indication (RSSI) is greater than or equal to a predetermined threshold value) while determining whether the channel is vacant (e.g., in a case of 4, after passing 3 out of 7), a terminal waits until the end of the channel occupancy, waits for $T_d$ again, determines whether the channel is vacant for the remaining time period of 4, and then performs transmission. As shown in the Table 1 above, an LBT scheme having a low CAPC is used when traffic having a high priority is transmitted.

Figure 6:
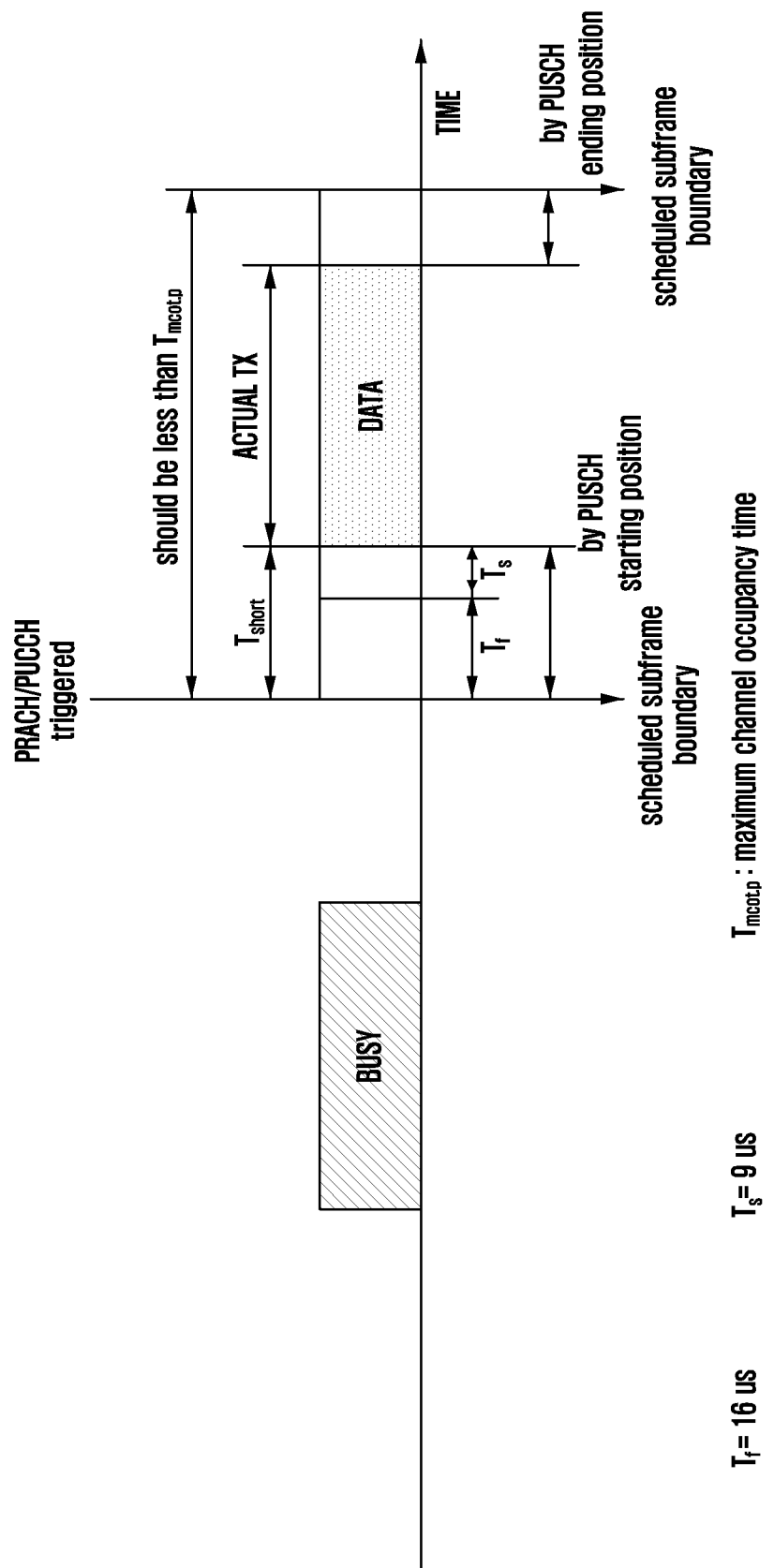
FIG. 6 illustrates LBT type 2 according to an embodiment.

FIG. 6 illustrates LBT type 2 according to an embodiment.

Referring to FIG. 6, in LBT type 2, before performing transmission, a time to listen to whether other peripheral devices perform transmission is fixed, and therefore transmission is immediately performed when a channel is vacant for the fixed time period. As illustrated in FIG. 6, in the LBT type 2 scheme, when a communication device needs to perform transmission, the communication device listens to (senses) the channel for the fixed time period of $T_{short}$ ($=T_f+T_s$), and immediately transmits data if the channel is determined to be vacant. LBT type 2 may be used when a signal having a very high priority is transmitted. Accordingly, the above-described random access preamble (4-11 of FIG. 4) and the described PUCCH are signals having high importance and may be transmitted using the LBT type 2 scheme.

Figure 7:
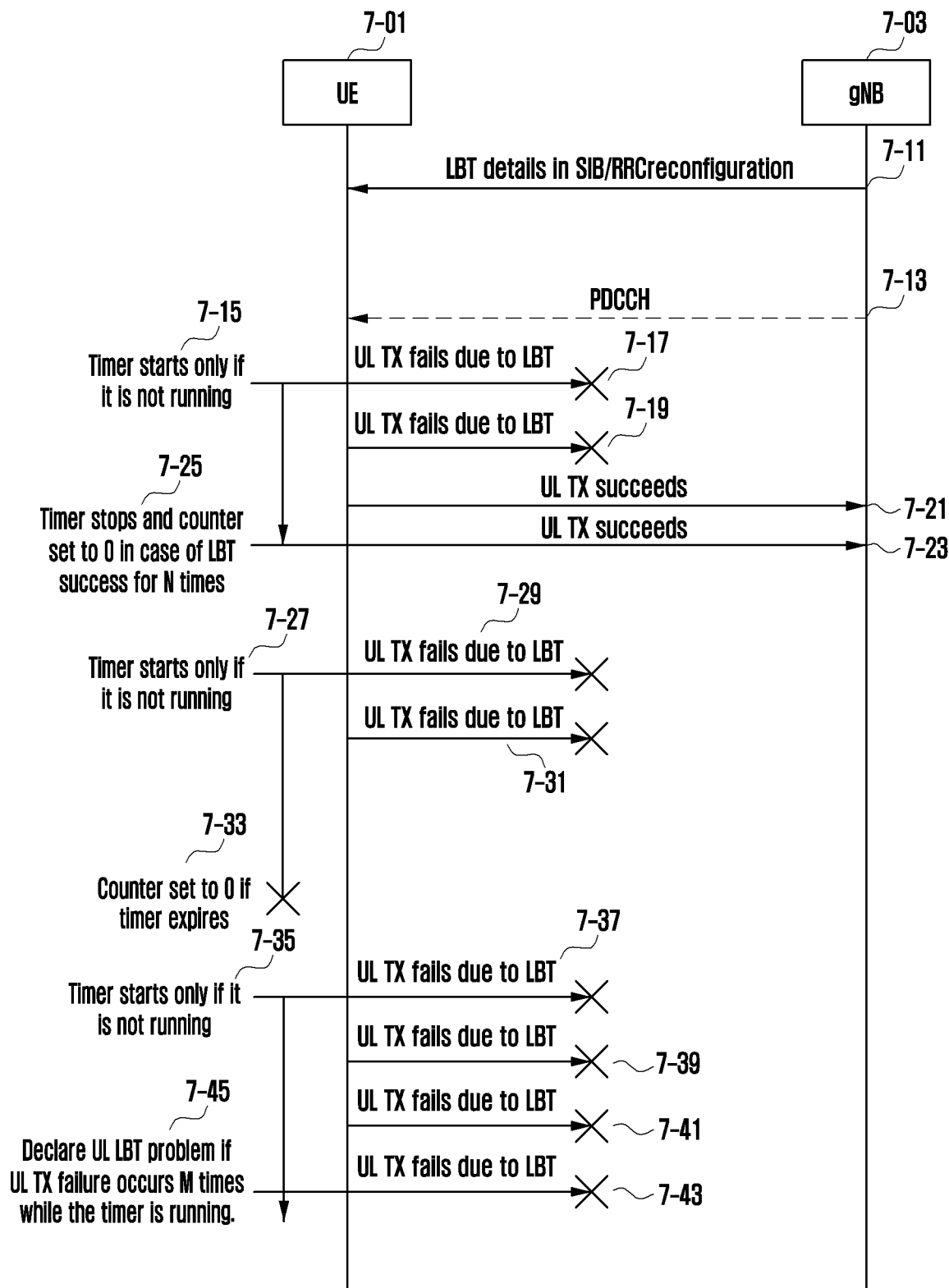
FIG. 7 illustrates a procedure between a terminal and a base station when the terminal identifies an uplink LBT problem according to an embodiment.

FIG. 7 illustrates a procedure between a terminal and a base station when the terminal identifies an uplink LBT problem according to an embodiment.

Referring to FIG. 7, it is assumed that a terminal (or UE) 7-01 accesses a base station 7-03 operating in an unlicensed band, and is in an RRC connected (RRC_CONNECTED) state. In the RRC connection state, the terminal 7-01 may perform data transmission or reception with the base station 7-03.

In step 7-11, the terminal 7-01 receives, from the base station 7-03, a configuration of a parameter related to uplink LBT problem detection, via an RRCReconfiguration message or an SIB message.

In step 7-13, the terminal 7-01 receives an uplink resource scheduled from the base station 7-03 via a PDCCH, or may perform uplink transmission for performing random access, PUCCH transmission, data transmission to a configured uplink grant, etc.

If data is transmitted in the unlicensed band, the terminal 7-01 should perform an LBT operation, and configure a type of LBT to be performed for each logic channel within the RRC message or for each corresponding uplink resource allocation in the PDCCH. The terminal 7-01 may perform LBT according to a configuration of a highest (or lowest) priority from among logic channels to which transmitted data belongs.

If the terminal 1-01 is unable to perform transmission due to an LBT failure when performing uplink transmission (i.e., if a signal is detected due to transmission of another device in the channel, and therefore transmission cannot be performed), in step 7-15, the terminal 7-01 determines whether a predetermined timer is running. If the timer is not running, the terminal 7-01 drives the timer. A length of the timer may be configured according to the RRCReconfiguration or SIB message.

In the example of FIG. 7, each time LBT fails in steps 7-17 and 7-19, a predetermined counter is increased, which allows the counter to recognize seriousness of a UL LBT problem, while the timer is running, and perform an additional operation when the counter reaches a value configured by the base station 7-03 according to the RRCReconfiguration or SIB message.

In the example of FIG. 7, while the timer is running, uplink transmission is successful (by succeeding in LBT) in steps 7-21 and 7-23. Accordingly, before reaching the value configured by the counter, when the uplink transmission succeeds in steps 7-21 and 7-23 a preset number of times (two times in FIG. 7), the terminal stops the timer and sets the counter to 0 7-25. The preset number of times may be configured by the base station 7-03. This procedure determines that smooth data transmission/reception is available because uplink transmission has become smooth again.

As another example, when the terminal 7-01 is unable to perform transmission due to an LBT failure when the terminal 7-01 performs uplink transmission, the terminal 7-01 determines whether the timer is running, and in step 7-27, operates the timer when the timer is not running. Subsequently, in the example of FIG. 7, transmission fails due to an LBT failure in steps 7-29 and 7-31. However, if the failure does not occur a preset number of times, e.g., as configured by the base station 7-03, before the timer expires, when the timer expires in step 7-33, the terminal 7-01 determines that an uplink LBT problem no longer occurs, and sets the counter to 0.

As another example, when the terminal 7-01 is unable to perform transmission due to an LBT failure when the terminal 7-01 performs uplink transmission, the terminal determines whether the timer is running, and in step 7-35, operates the timer when the timer is not running. Therefore, if the terminal 7-01 has further attempted to perform uplink transmission, continuously fails to perform transmission due to a UL LBT issue in steps 7-37 to 7-43, and the failure has occurred a preset number times, e.g., four times, as configured by the base station 7-03, in step 7-45, the terminal 7-01 recognizes that an uplink LBT problem has occurred.

As another example, if a terminal is unable to perform transmission due to an LBT failure when the terminal performs uplink transmission, the terminal determines whether the timer is running, and operates the timer if the timer is not running. The terminal may restart the timer each time an LBT failure occurs, and if the counter value reaches a value configured by a base station while the timer is running, the terminal recognizes that an uplink LBT problem has occurred, and performs an additional procedure.

Figure 8A:
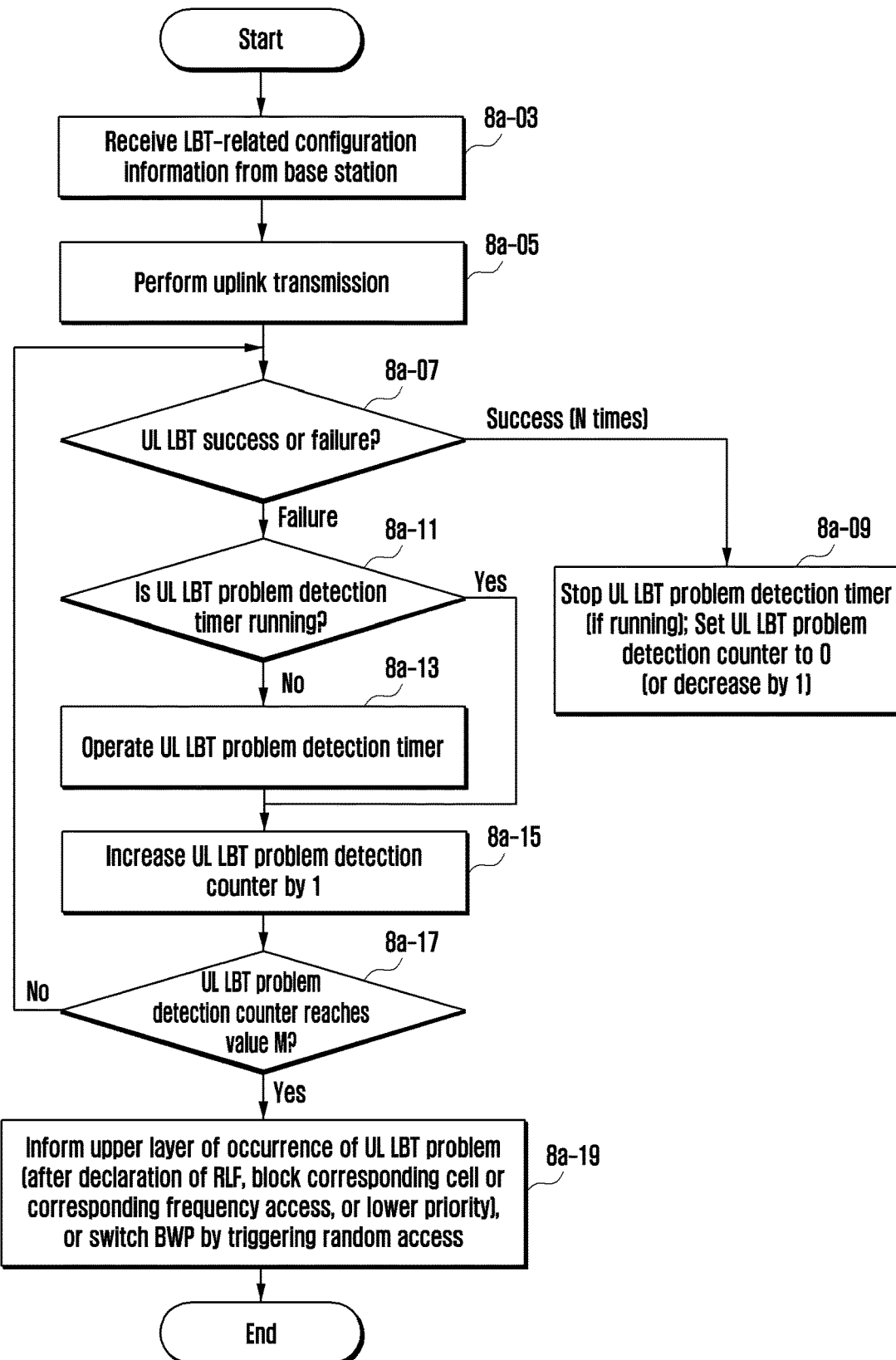
FIG. 8A is a flowchart illustrating a sequence of operations of a terminal identifying an uplink LBT problem according to an embodiment.

FIG. 8A is a flowchart illustrating a sequence of operations of a terminal when identifying an uplink LBT problem according to an embodiment.

Referring to FIG. 8A, after a terminal accesses a base station operating in an unlicensed band, and is in an RRC connected state, the terminal may perform data transmission or reception with the base station.

In step 8a-03, the terminal receives, from the base station, a configuration related to uplink LBT problem detection via an RRCReconfiguration message or an SIB message.

In step 8a-05, the terminal receives an uplink resource scheduled from the base station via a PDCCH, and performs uplink transmission for performing random access, PUCCH transmission, data transmission to a configured uplink grant, etc.

If data is transmitted in the unlicensed band, the terminal should perform an LBT operation, and configure a type of LBT to be performed for each logic channel within the RRC message or for each corresponding uplink resource allocation in the PDCCH, and the terminal may perform LBT according to a configuration of a highest (or lowest) priority from among logic channels to which actually transmitted data belongs.

In step 8a-07, the terminal determines if the UL LBT has been successful or has failed.

If UL LBT failure has occurred in step 8a-07, the terminal determines whether a predetermined timer is running in step 8a-11.

If the timer is not running in step 8a-11, the terminal operates the timer in step 8a-13. A length of the timer may be configured according to the RRCReconfiguration or SIB message. In step 8a-15, each time the LBT fails, the terminal increases a predetermined counter. The counter is used to recognize seriousness of an UL LBT problem and perform an additional operation when the counter reaches a value configured by the base station according to the RRCReconfiguration or SIB message.

Accordingly, while the timer is running, the terminal determines if a UL LBT failure has occurred a preset number of times in step 8a-17.

If the UL LBT failure has occurred the preset number of times in step 8a-17, the terminal recognizes that an uplink LBT problem has occurred, and performs an additional procedure in step 8a-19.

Examples of the additional procedure include the following.

In a first example, a MAC layer of the terminal informs an upper layer (e.g., an RRC layer) that a UL LBT problem has occurred, and then the upper layer of the terminal declares a radio link failure (RLF). If the radio link failure is declared, the terminal selects a cell having a strongest signal from among neighboring cells, and attempts to re-establish the connection (connection re-establishment). If the same cell as a previous cell or a cell at the same frequency as a cell used by the previous cell is selected, because the uplink LBT problem may continue to occur, the terminal may assume that the previous cell or the frequency of the previous cell has been barred (or lower an access priority of the cell/frequency) and may select a cell.

Alternatively, another frequency band of a corresponding cell may be used without declaring an RLF as in the above example. Next-generation communication systems, such as NR, support a bandwidth of a broadband (e.g., 100 MHz) for one cell, and the base station may perform communication by configuring, to the terminal, only a part of the bandwidth of one cell's bandwidth. The part of the bandwidth is referred to as a bandwidth part (BWP). The BWP may be configured for each terminal and may be configured via an RRCReconfiguration message from the base station. Accordingly, if a BWP having a width of 20 MHz of multiple 100 MHz cells is configured in the terminal, the terminal is operating in a specific BWP thereof, and a channel condition of another BWP is good, a scenario of moving to a corresponding channel and performing operation without declaration of the RLF may be considered. If the terminal recognizes that the described uplink LBT problem has occurred, the terminal determines a BWP allowing random access (i.e., BWP to which a PRACH resource is configured) from among the BWPs configured in the terminal. Therefore, one BWP is selected by determining whether a channel is congested, from among BWPs allowing random access.

Channel congestion may be determined based on a BWP-specific occupancy rate of time in which a signal level for a predetermined time period exceeds a predetermined threshold value. If the terminal selects a BWP allowing one random access, the terminal performs random access using the BWP. A network may have pre-allocated a dedicated resource (e.g., a dedicated preamble) for the random access in advance, and if the dedicated resource is available, the terminal may perform random access using the pre-allocated resource, and otherwise, the terminal performs random access using the described contention-based random access. If the terminal performs the contention-based random access, the base station may not know why the terminal performs the random access, and Msg3 may be used to inform that the terminal has performed the random access due to occurrence of an uplink LBT problem. This may be informed using a MAC control element (CE) message, and the MAC CE may be 1 byte size, in which only a MAC sub-header exists, or a MAC CE accompanying a payload.

For the 1-byte sized MAC CE in which only the MAC sub-header exists, a notification that the terminal has performed random access due to an occurrence of the uplink LBT problem may be provided via a logic channel identifier included in the MAC sub-header. For the MAC CE accompanying a payload, the reason why the terminal performs random access may be separately informed via an additional field in the payload, and another reason may also be included in the additional field. For example, it may also be informed that the terminal performs random access due to a transmission failure caused by deviation of communication beams. Accordingly, the base station may know that the terminal has performed random access due to an uplink LBT problem, and may further perform operations, such as allowing handover to another base station or switching the BWP for operation of stopping use even for other terminals with respect to the BWP in which the terminal used to operate.

Although the examples above assume a scenario in which the terminal operates in a PCell, a scenario in which an uplink LBT problem occurs in an SCell may also be considered. In this case, the terminal may report an SCell in which the uplink LBT problem has occurred, to the base station, by using an RRC layer message. The base station may perform an operation, such as deactivation of the SCell or canceling the configuration of the SCell.

When the terminal determines that UL LBT has been successful in step 8a-07, the terminal stops the timer and sets the counter to 0 8a-09.

For example, while the timer is running, uplink transmission may be successful (by succeeding in LBT). If uplink transmission succeeds a preset number of times N, e.g., as configured by the base station, the terminal stops the timer and sets the counter to 0 8a-09. Alternatively, the counter may be decreased by one instead of stopping the timer.

Figure 8B:
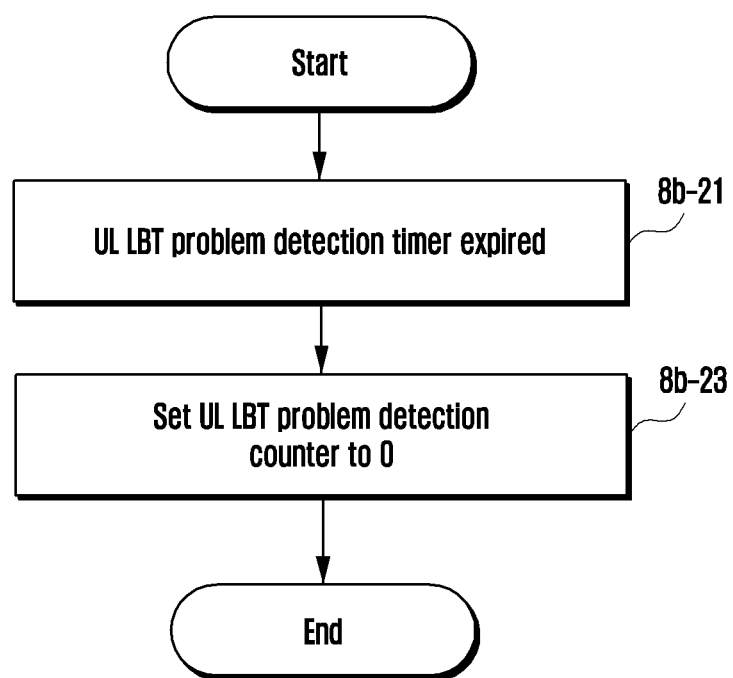
FIG. 8B is a flowchart illustrating a sequence of operations of a terminal in case that timer expires according to an embodiment.

FIG. 8B is a flowchart illustrating a sequence of operations of a terminal in case that timer expires according to an embodiment.

Referring to FIG. 8B, when the timer expires before the present number failures occurs in step 8b-21, the terminal determines that an uplink LBT no longer occurs and sets the counter to 0 in step 8b-23.

Figure 9:
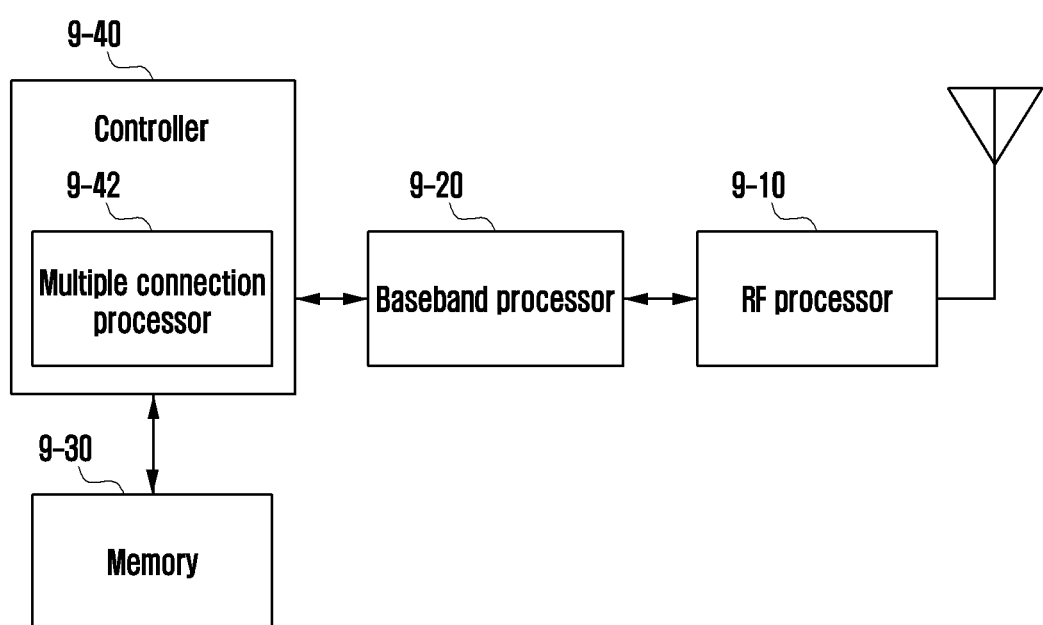
FIG. 9 illustrates a terminal in a wireless communication system according to an embodiment.

FIG. 9 illustrates a terminal in a wireless communication system according to an embodiment.

Referring to FIG. 9, the terminal includes a radio frequency (RF) processor 9-10, a baseband processor 9-20, a memory 9-30, and a controller 9-40.

The RF processor 9-10 performs functions for transmitting or receiving signals via a wireless channel, such as band conversion and amplification of the signals. The RF processor 9-10 up-converts a baseband signal provided from the baseband processor 9-20 into an RF band signal, transmits the converted RF band signal through an antenna, and then down-converts the RF band signal received through the antenna into a baseband signal. The RF processor 9-10 may include a transmission filter, a reception filter, an amplifier, a mixer, an oscillator, a digital-to-analog converter (DAC), an analog-to-digital converter (ADC), etc. Although only one antenna is illustrated in FIG. 9, the terminal may have a plurality of antennas. The RF processor 9-10 may include a plurality of RF chains. The RF processor 9-10 may perform beamforming. For beamforming, the RF processor 9-10 may adjust a phase and a magnitude of each signal transmitted or received via the plurality of antennas or antenna elements.

The baseband processor 9-20 performs conversion between a baseband signal and a bitstream according to a physical layer specification of a system. During data transmission, the baseband processor 9-20 generates complex symbols by encoding and modulating a transmission bitstream. During data reception, the baseband processor 9-20 reconstructs a reception bitstream via demodulation and decoding of a baseband signal provided from the RF processor 9-10. In an OFDM scheme, during data transmission, the baseband processor 9-20 generates complex symbols by encoding and modulating a transmission bitstream, maps the complex symbols to sub-carriers, and then configures OFDM symbols by performing an inverse fast Fourier transform (IFFT) operation and cyclic prefix (CP) insertion. During data reception, the baseband processor 9-20 divides the baseband signal provided from the RF processor 9-10 into OFDM symbols, reconstructs the signals mapped to the sub-carriers via a fast Fourier transform (FFT) operation, and then reconstructs the reception bitstream via demodulation and decoding.

The baseband processor 9-20 and the RF processor 9-10 transmit and receive signals as described above. Accordingly, the baseband processor 9-20 and the RF processor 9-10 may be collectively referred to as a transmitter, a receiver, a transceiver, and/or a communication unit. At least one of the baseband processor 9-20 and the RF processor 9-10 may include a plurality of communication modules supporting a plurality of different radio access technologies. At least one of the baseband processor 9-20 and the RF processor 9-10 may include different communication modules to process signals of different frequency bands. The different radio access technologies may include a wireless LAN (e.g., IEEE 802.11), a cellular network (e.g., LTE), etc. The different frequency bands may include a super high frequency (SHF) band (e.g., 2.5 GHz and 5 GHz) and a millimeter wave band (e.g., 60 GHz).

The memory 9-30 stores data, such as a default program, an application program, configuration information, etc., for operation of the terminal. The memory 9-30 may store information related to a wireless LAN node performing wireless communication using a wireless LAN access technology. The memory 9-30 provides stored data in response to a request of the controller 9-40.

The controller 9-40 controls overall operations of the terminal. The controller 9-40 transmits or receives a signal via the baseband processor 9-20 and the RF processor 9-10. The controller 9-40 records and reads data in the memory 9-30. The controller 9-40 may include at least one processor. The controller 9-40 may include a communication processor (CP) configured to perform control for communication and an application processor (AP) configured to control an upper layer, such as an application program.

In FIG. 9, the controller 9-40 includes a multiple connection processor 9-42 configured to perform processing for operating in the multiple connection mode. The controller 9-40 may control the terminal to perform the procedures illustrated in FIG. 5.

The controller 9-40 may detect a UL LBT program, e.g., by using the described methods, and trigger random access or indicate an RRC layer to perform an RLF operation.

Methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the memories may form a memory in which the program is stored. Further, a plurality of such memories may be included in the electronic device.

In addition, the programs may be stored in an attachable storage device which may access the electronic device through communication networks such as the Internet, an Intranet, a LAN, a Wide LAN (WLAN), and Storage Area Network (SAN) or a combination thereof. Such a storage device may access the electronic device via an external port. Further, a separate storage device on the communication network may access a portable electronic device.

In the above-described embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to certain embodiments thereof, it will be understood by those skilled in the art that various changes in form and details may be made therein without departing from the spirit and scope of the disclosure as defined by the appended claims and any equivalents thereof.

What is claimed is:

1. A method performed by a terminal in a wireless communication system, the method comprising:
    receiving configuration information including listen before talk (LBT)-related information;
    performing an LBT for a first bandwidth part (BWP) of a serving cell;
    in case that a failure for the LBT is detected based on the configuration information as a result of performing the LBT, triggering an LBT failure for the first BWP;
    identifying whether the serving cell is a primary cell or a secondary cell; and
    in case that the serving cell is the primary cell, switching from the first BWP to a second BWP of the serving cell, the second BWP being configured with a physical random access channel (PRACH) resource and being for which the LBT failure is not triggered.

2. The method of claim 1, further comprising, in case that the serving cell is the secondary cell, transmitting a control message associated with the LBT failure.

3. The method of claim 1, further comprising performing a radio resource control (RRC) re-establishment procedure in case that the LBT failure is triggered for all BWPs of the serving cell.

4. The method of claim 3, further comprising indicating, by a medium access control (MAC) layer of the terminal, the LBT failure to an upper layer.

5. The method of claim 1, wherein the LBT-related information comprises information on a timer for a detection of the LBT failure and information on a maximum counter value for the detection of the LBT failure.

6. The method of claim 5, wherein triggering the LBT failure comprises:
    starting the timer and increasing a counter value, in case that an uplink signal transmission based on the LBT is not performed; and
    triggering the LBT failure for the first BWP, in case that the counter value is greater than or equal to the maximum counter value.

7. The method of claim 6, further comprising setting the counter value to 0, in case that the timer expires.

8. The method of claim 1, further comprising performing a random access procedure for the second BWP.

9. A terminal in a wireless communication system, the terminal comprising:
    a transceiver; and
    a controller configured to:
        receive, via the transceiver, configuration information including listen before talk (LBT)-related information,
        perform an LBT for a first bandwidth part (BWP) of a serving cell,
        in case that a failure for the LBT is detected based on the configuration information as a result of performing the LBT, trigger an LBT failure for the first BWP,
        identify, whether the serving cell is a primary cell or a secondary cell, and
        in case that the serving cell is the primary cell, switch from the first BWP to a second BWP of the serving cell, the second BWP being configured with a physical random access channel (PRACH) resource and being for which the LBT failure is not triggered.

10. The terminal of claim 9, wherein the controller if further configured to, in case that the serving cell is the secondary cell, transmit, via the transceiver, a control message associated with the LBT failure.

11. The terminal of claim 9, wherein the controller is further configured to perform a radio resource control (RRC) re-establishment procedure, in case that the LBT failure is triggered for all BWPs of the serving cell.

12. The terminal of claim 11, wherein the controller further is configured to indicate, by a medium access control (MAC) layer of the terminal, the LBT failure to an upper layer.

13. The terminal of claim 9, wherein the LBT-related information comprises information on a timer for a detection of the LBT failure and information on a maximum counter value for the detection of the LBT failure.

14. The terminal of claim 13, wherein, to trigger the LBT failure, the controller is further configured to:
    start the timer and increase a counter value, in case that an uplink signal transmission based on the LBT is not performed, and
    trigger the LBT failure for the first BWP, in case that the counter value is greater than or equal to the maximum counter value.

15. The terminal of claim 14, wherein the controller is further configured to set the counter value to 0, in case that the timer expires.

16. The terminal of claim 9, wherein the controller is further configured to perform a random access procedure for the second BWP.

\* \* \* \* \*